(12) United States Patent
Lu et al.

(10) Patent No.: US 10,489,415 B2
(45) Date of Patent: Nov. 26, 2019

(54) METHOD AND SYSTEM FOR COLLATING AND PRESENTING INFORMATION

(71) Applicant: pVelocity Inc., Toronto (CA)

(72) Inventors: Kang Lu, Toronto (CA); Vivian Yeung, Toronto (CA); Michael Lee, Toronto (CA); Bill Parousis, Toronto (CA); Keling Zhang, Toronto (CA); Dale deFreitas, Toronto (CA)

(73) Assignee: pVelocity Inc., Toronto (CA)

( * ) Notice: Subject to any disclaimer, the term of this patent is extended or adjusted under 35 U.S.C. 154(b) by 295 days.

(21) Appl. No.: 14/150,541

(22) Filed: Jan. 8, 2014

(65) Prior Publication Data

US 2014/0195552 A1 Jul. 10, 2014

Related U.S. Application Data

(60) Provisional application No. 61/750,934, filed on Jan. 10, 2013.

(51) Int. Cl.
*G06F 17/30* (2006.01)
*G06F 7/00* (2006.01)
(Continued)

(52) U.S. Cl.
CPC ............ *G06F 16/25* (2019.01); *G06F 16/211* (2019.01)

(58) Field of Classification Search
CPC ............ H04N 21/252; H04N 21/25808; G06F 17/30566; G06F 17/30657;
(Continued)

(56) References Cited

U.S. PATENT DOCUMENTS 6,654,950 B1 * 11/2003 Barnishan ................ G06F 8/76
717/136
9,031,900 B2 * 5/2015 Albrecht ........... G06F 17/30592
707/600
(Continued)

*Primary Examiner* — Kuen S Lu
(74) *Attorney, Agent, or Firm* — McMillan LLP

(57) ABSTRACT

A system and method for collating and presenting information including at least one structured data source on a non-transitory computer readable medium; at least one unstructured data source on a non-transitory computer readable medium; an analytical engine in data communication with the at least one structured data source and the at least one unstructured data source; wherein the analytical engine combines and transforms data from the at least one structured data source and from the at least one unstructured data source into newly structured data; the newly structured data being stored on a computer readable medium; an engine data handler adapted to correspond with the analytical engine and to access the newly structured data; a schema definition stored on a computer readable medium accessible by the analytical engine and executed by a computer processor to define a domain of the newly structured data and one or more state views within the domain; a processor for configuring the at least one or more state views into at least one visual element capable of being displayed on a screen; and, a grid module executed by the processor and adapted to display the at least one visual element on the screen.

16 Claims, 7 Drawing Sheets

(51) Int. Cl.
*G06F 16/25* (2019.01)
*G06F 16/21* (2019.01)

(58) Field of Classification Search
CPC ......... G06F 17/30539; G06F 17/30696; G06F 17/30867; G06F 17/30557; G06F 17/30292
USPC ........................................................ 707/756
See application file for complete search history.

(56) References Cited

U.S. PATENT DOCUMENTS

| | | | |
|---|---|---|---|
| 2005/0050037 A1* | 3/2005 | Frieder | G06F 17/30976 |
| 2010/0049590 A1* | 2/2010 | Anshul | G06F 17/2785 |
| | | | 705/7.32 |
| 2012/0101860 A1* | 4/2012 | Ezzat | G06Q 10/06 |
| | | | 705/7.11 |
| 2013/0019262 A1* | 1/2013 | Bhatia | H04N 21/252 |
| | | | 725/34 |
| 2013/0339379 A1* | 12/2013 | Ferrari | G06F 17/30595 |
| | | | 707/766 |
| 2014/0379699 A1* | 12/2014 | Blyumen | G06F 3/04842 |
| | | | 707/722 |

\* cited by examiner

FIG. 7

METHOD AND SYSTEM FOR COLLATING AND PRESENTING INFORMATION

CROSS-REFERENCE TO RELATED APPLICATIONS

This application claims the benefits of U.S. Provisional Patent Application No. 61/750,034 filed Jan. 10, 2013, the entire contents of which is incorporated herein by reference.

FIELD OF THE INVENTION

The present invention relates generally to data processing. More particularly, the present invention relates to a method and system for collating and presenting information.

BACKGROUND OF THE INVENTION

Collecting business, manufacturing or financial data, for example, is generally well known in the art, and a plurality of business enterprise systems or data extraction tools are known. In this manner, when reports are required to be run targeted to particular aspects of data required, a user may run a set of software commands or select predetermined report types, following which the software being used queries a database of information and generates a set of results. It will be understood that this is a general example, and there are a large number of tools available that companies and individuals can use for generating reports based on stored data.

Other types of reports that may be desired are company profile reports, financial information such as stock prices, and social media and news information. Obtaining this information generally requires a user to access a plurality of different information sources to pool together information retrieved from different origins.

This poses a problem in the prior art, whereby a snapshot of information from a plurality of different sources of information is not readily available. When access to such information is required with minimal delay, or where comparing or viewing information from a variety of sources, users typically have to arrange various windows on a computer screen, or access different online sources such as websites from different windows and arrange the windows to most effectively view information searched for and formatted from presentation by the user themselves.

Accordingly, it is an object of the invention to provide a novel method and system for collating and presenting information.

SUMMARY OF THE INVENTION

According to one embodiment of the invention, there is provided a system for collating and presenting information including at least one structured data source on a non-transitory computer readable medium; at least one unstructured data source on a non-transitory computer readable medium; an analytical engine in data communication with the at least one structured data source and the at least one unstructured data source; wherein the analytical engine combines and transforms data from the at least one structured data source and from the at least one unstructured data source into newly structured data; the newly structured data being stored on a computer readable medium; an engine data handler adapted to correspond with the analytical engine and to access the newly structured data; a schema definition stored on a computer readable medium accessible by the analytical engine and executed by a computer processor to define a domain of the newly structured data and one or more state views within the domain; a processor for configuring the at least one or more state views into at least one visual element capable of being displayed on a screen; and, a grid module executed by the processor and adapted to display the at least one visual element on the screen.

According to one aspect of this embodiment, there is further provided at least one secondary structured data source; at least one secondary unstructured data source; a first data handler in communication with the at least one secondary structured data source; and, a second data handler in communication with the at least one secondary unstructured data source.

According to another aspect of this embodiment, there is further provided at least one client computing devices in data communication with the analytical engine.

According to another aspect of this embodiment, the at least one client computing devices are in data communication with one or both of the first and second data handlers, independently of the engine data handler.

According to another aspect of this embodiment, the at least one secondary structured data source includes an SQL data source.

According to another aspect of this embodiment, the at least one secondary unstructured data source includes a social media feed.

According to another aspect of this embodiment, there is provided additional schema definitions accessible by the at least one client computing device to define at least one additional domain based on one or both of the secondary structured data and the secondary unstructured data.

According to another aspect of this embodiment, the grid module executed by the processor and includes predefined grid definitions adapted to display a plurality of the at least one visual elements on the screen.

According to another aspect of this embodiment, the predefined grid definitions include instructions for displaying each of the plurality of visual elements in their entirety on the screen in a single display view.

According to a second embodiment of the invention, there is provided a method for collating and presenting information including providing at least one structured data source on a non-transitory computer readable medium; providing at least one unstructured data source on a non-transitory computer readable medium; combining and transforming the at least one structured data source and the at least one unstructured data source into newly structured data using an analytical engine in data communication with the at least one structured data source and the at least one unstructured data source; storing the newly structured data on a computer readable medium; accessing the newly structured data by an engine data handler; providing a schema definition stored on a computer readable medium accessible by the analytical engine and executing the schema definition by a computer processor to define a domain of the newly structured data and one or more state views within the domain; configuring the at least one or more state views into at least one visual element capable of being displayed on a screen; and, displaying by a grid module the at least one visual element on the screen.

According to one aspect of the second embodiment, the method further includes providing at least one secondary structured data source; providing at least one secondary unstructured data source; accessing the at least one secondary structured data source by a first data handler; and, accessing the at least one secondary unstructured data source by a second data handler.

According to another aspect of the second embodiment, the method further includes providing at least one client computing devices in data communication with the analytical engine.

According to another aspect of the second embodiment, the at least one client computing devices are in data communication with one or both of the first and second data handlers, independently of the engine data handler.

According to another aspect of the second embodiment, the at least one secondary structured data source includes an SQL data source.

According to another aspect of the second embodiment, the at least one secondary unstructured data source includes a social media feed.

According to another aspect of the second embodiment, the method further includes providing additional schema definitions accessible by the at least one client computing device to define at least one additional domain based on one or both of the secondary structured data and the secondary unstructured data.

According to another aspect of the second embodiment, the grid module includes predefined grid definitions adapted to display a plurality of the at least one visual elements on the screen.

According to another aspect of the second embodiment, the predefined grid definitions include instructions for displaying each of the plurality of visual elements in their entirety on the screen in a single display view.

BRIEF DESCRIPTION OF THE DRAWINGS

Embodiments will now be described, by way of example only, with reference to the attached Figures, wherein:

Figure 7:
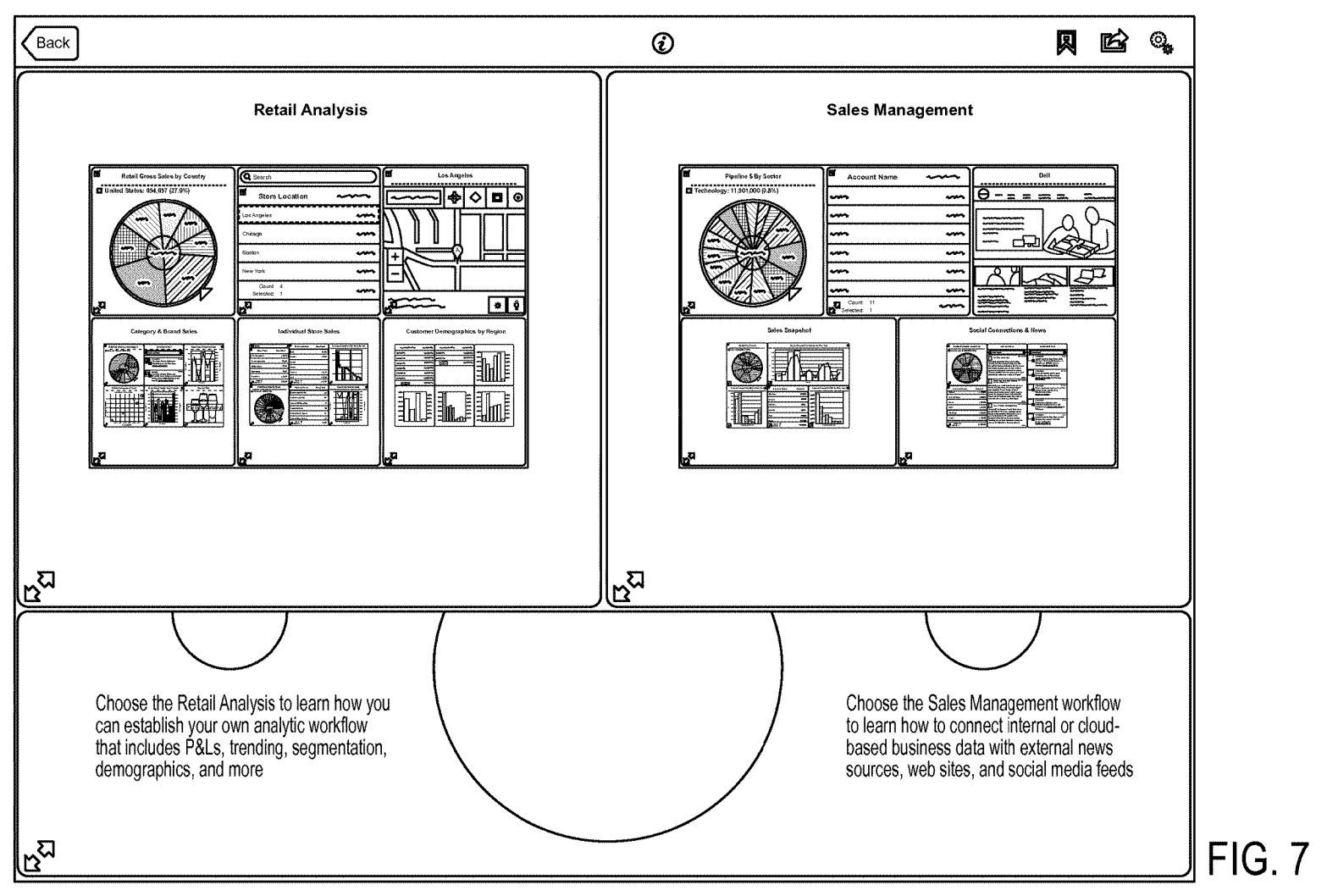

FIGS. 3 to 7 show various screen resulting from carrying out the invention.

DETAILED DESCRIPTION OF THE EMBODIMENTS

As business enterprises gain more access to data from both sources internal to the enterprise or external thereto, the need to manage, present and extract useful information from this data is becoming a significant challenge as the amount of accessible data increases. The present invention is broadly directed to a method and system which assists in the management, presentation and extraction of data from large and varied data sources, with particular emphasis on the collation and presentation of information generated from a plurality of data sources.

While generally described in relation to business enterprises, the invention is equally applicable to any type of individual or organizational user and is only otherwise limited by the language of the claims.

The collation and presentation of information according to the invention is carried out over structured data and unstructured data derived from sources both internal and external (generally via the Internet) to the business enterprise itself Structured data is any data which is structured according to a known organizational scheme, such as data stored in relational database systems as SQL (Structured Query Language) data. Unstructured data is intended to refer to any data that is not structured according to a known organizational scheme and is also intended to encompass semi-structured data.

The systems as herein described may be implemented in various ways, including as a plurality of functional components, each of which can be implemented by any combination of hardware and software programmed and configured to perform their associated function. In the described embodiments, each functional component can be considered a software module stored on a non-transitory computer readable medium and executed by an associated computer processor, but it will be appreciated that other implementations of the functional components are also contemplated. Such other implementations may include dedicated hardware, dedicated software or a combination of hardware and machine readable instructions in other forms.

Figure 1:
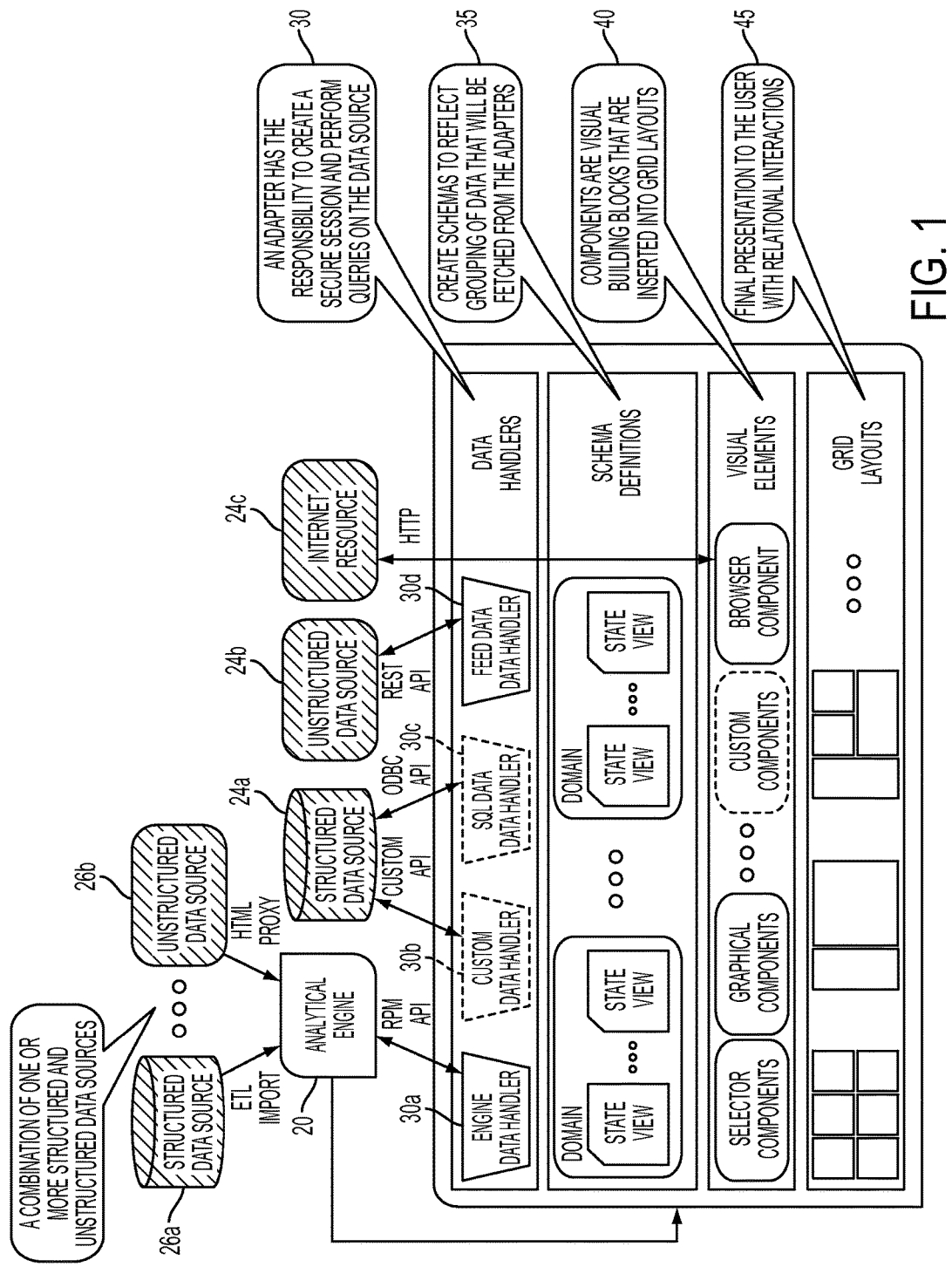
FIG. 1 shows a high-level architecture of an system for providing business intelligence data in accordance with an embodiment of the invention and its operating environment.

Referring now to FIG. 1, there is shown an analytical engine 20 for collating and presenting information, and its operating environment. The analytical engine 20 is preferably implemented on a computer system and thereby adapted to extract, transform and load data from a plurality of data sources 24. Data sources 24 include at least one structured data source 24a and at least one unstructured data source 24b. There may be a plurality of structured 24a and unstructured 24b data sources. The data sources 24a and 24b may be any type of information storage, extracting or gathering system that stores, processes, manipulates or extracts data. Some examples of data contemplated by the preferred embodiment of the invention includes, by way of non-limiting examples, finance/accounting, manufacturing, sales and service, customer relationship management, etc.

Typically, the data sources 24 are computer readable medium accessible by the computer processor executing the analytical engine 20. The data sources 24 may operate in real time or next-to-real time, and each typically includes a database that aggregates data particular to the data source 24. By operating in real time or next-to-real time it is meant that information is gathered and becomes available for retrieval in real time or next-to-real time. This is in contradistinction to data sources which are updated periodically and so access to information by third party systems (such as the analytical engine 20 in this case) would be delayed based on a data update schedule. The data sources 24 may have a means for displaying the data themselves, and typically also includes a means for outputting data that may be communicated with by the analytical engine 20, or alternatively, data displayed on the means for displaying data can be imported by the analytical engine 20 based solely on the display. Ways of implementing such data retrieval are generally known in the art and are therefore not described herein in further detail.

One or more client computing devices are in communication with the analytical engine 20, either directly or over a communications network, such as the Internet. Client computing devices may be desktop computers, notebook computers, mobile devices with embedded operating systems, etc. While, in this particular embodiment, the Internet is shown, any other communications network enabling communications between the various devices can be substituted. For example, the described embodiments may be readily adaptable to networks internal to an organization. The client computing devices may be personal computers that execute a business intelligence client for connecting to, querying and receiving response data from the analytical server.

It is also contemplated that features provided by the analytical engine 20 may be implemented as an information module in software at each of the computing devices. In this embodiment, the computing devices include computer readable instructions stored on a computer readable medium for carrying out the functionality of the analytical engine 20 as herein described.

In the illustrated embodiment, the analytical engine 20 communicates with a quad-level hierarchy on one or more computing devices that includes data handlers 30, schema definitions 35, visual elements 40 and grid layout definitions 45. In some embodiments, the analytical engine 20 incorporates one or more levels of the quad-level hierarchy, for example, one or more of the data handlers 30. Although, incorporation of other levels are also contemplated. Otherwise, levels of the hierarchy may be stored on computing devices in communication with the analytical engine 20. The analytical engine 20 generally functions as a pre-aggregation platform which converts structured data and unstructured data from a structured data source 26a and an unstructured data source 26b into a form interpretable via the engine data handler 30a.

In the preferred embodiment, a computing device is able to leverage sourced information via the analytical engine or via specific data handlers 30b-30d, without the use of a pre-aggregation platform such as the analytical engine. Of course, making use of the analytical engine provides for quicker access to data, however, with direct access via the data handlers 30b-30d, additional user customization is possible or access to data sources may be provided which are not part of the analytical engine's plurality of data sources.

The data handlers 30 are software implemented adapters for creating a secure session, and performing queries on the source systems. Generally, each of the data handlers 30 include an adapter which handles the transfer of data from the data sources and an access client which provides access to this data. Other functions of the data handlers 30, or alternatively, separate data handlers may be implemented for performing other interactions with the source systems, such as consistency checks and statistics on how often data is accessed, for example. Data definitions are also defined by the data handlers 30 to identify structured and unstructured data types, and to deal with each appropriately. Offline data acquisition may also be implemented by the data handlers. In FIG. 1, an engine data handler 30a is illustrated which is adapted to manage data from the analytical engine 20. The data managed by the engine data handler 30a is structured data, having been converted to a known structure by the analytical engine 20 from any of the sources of data feeding into the analytical engine 20. A custom data handler 30b may be provided to manage select data from structured data source 24a. SQL data handler 30c could be provided to manage all data from the structured data source 24a. A feed data handler 30d could be provided to manage data from an unstructured data source, such as a social media feed or other internet source where data is driven largely by user content or user input in a non-standardized or semi-standardized manner. Other types of data handlers are also contemplated and those described herein are only meant to be exemplary. Furthermore, the terminology used to describe the data handlers in this description are for ease of understanding only, and are not intended to put limits on the capabilities of the types of data handlers being used, except where these capabilities are explicitly described. Access to each of the data handlers may be provided by an application programming interface (API). The general functioning of data handlers and APIs are otherwise known, and therefore not described in further detail. Of note with respect to the present invention is the arrangement of the engine data handler configured to interact with the analytical engine and the variety of additional data handlers configured to interact with any number of structured and unstructured data sources directly.

The data handlers are generally optimized to operate in a predetermined domain. Changes to the data handlers are automatically made for different domains. For the purposes of this description, a domain is defined as the context in which the information being gathered exists. Each domain may have one or more states, and further defines global mapping rules to harmonize terms across domains. These domain rules are implemented in schema definitions 35. The schema definitions 35 are software implemented schema to reflect groupings of data that will be retrieved from the data handlers 30 in response to a user query. Also implemented in the schema definitions are schema translations that implement various mapping algorithms to normalize the terminology used at different components or in data from various sources. In FIG. 1, two domains are illustrated which have different states. The schema definitions permit data extraction from each of the domains using a common set of terminology or search terms dictated by a user.

The visual elements 40 are representations of the data that are adapted to fit into the grid layout definitions 45. Visual elements are divided into individual components, each of which represent a visual model of a particular state view of a domain. These components are also adapted to send selected information downstream to other components on the same grid, and can received and then react to information from other components. The grid layout definitions 45 further define relational interactions between the visual elements 40 that are predetermined, or alternatively may be influenced by user imputers. The relational interactions are defined between components in the visual elements. Different components can be added or deleted from the grid layout. In summary, the visual elements 40 are discrete representations of information or data as it exists in a particular state of a given domain. The visual elements may include graphical components, selector components (ie. user selectable subsets of information), any custom components derived from the states of a domain, and a browser component which shows the content of a particular website. Each of the visual elements are configurable into a grid layout sized and otherwise dimensioned to fit into a particular screen space, typically the viewing limits of a monitor of a computing device.

Having described the general system according to the invention, a method for carrying out the invention using the system heretofore described will now be presented. One skilled in the art will appreciate that the method itself is thought to be an improvement over the prior art that may optionally be carried out using variations of the system described above. Where steps of the method are not described in their fullest detail, it is thought that a person skilled in the art having general computer programming abilities would readily be capable of implementing the functionality described having regard to this description.

Figure 2:
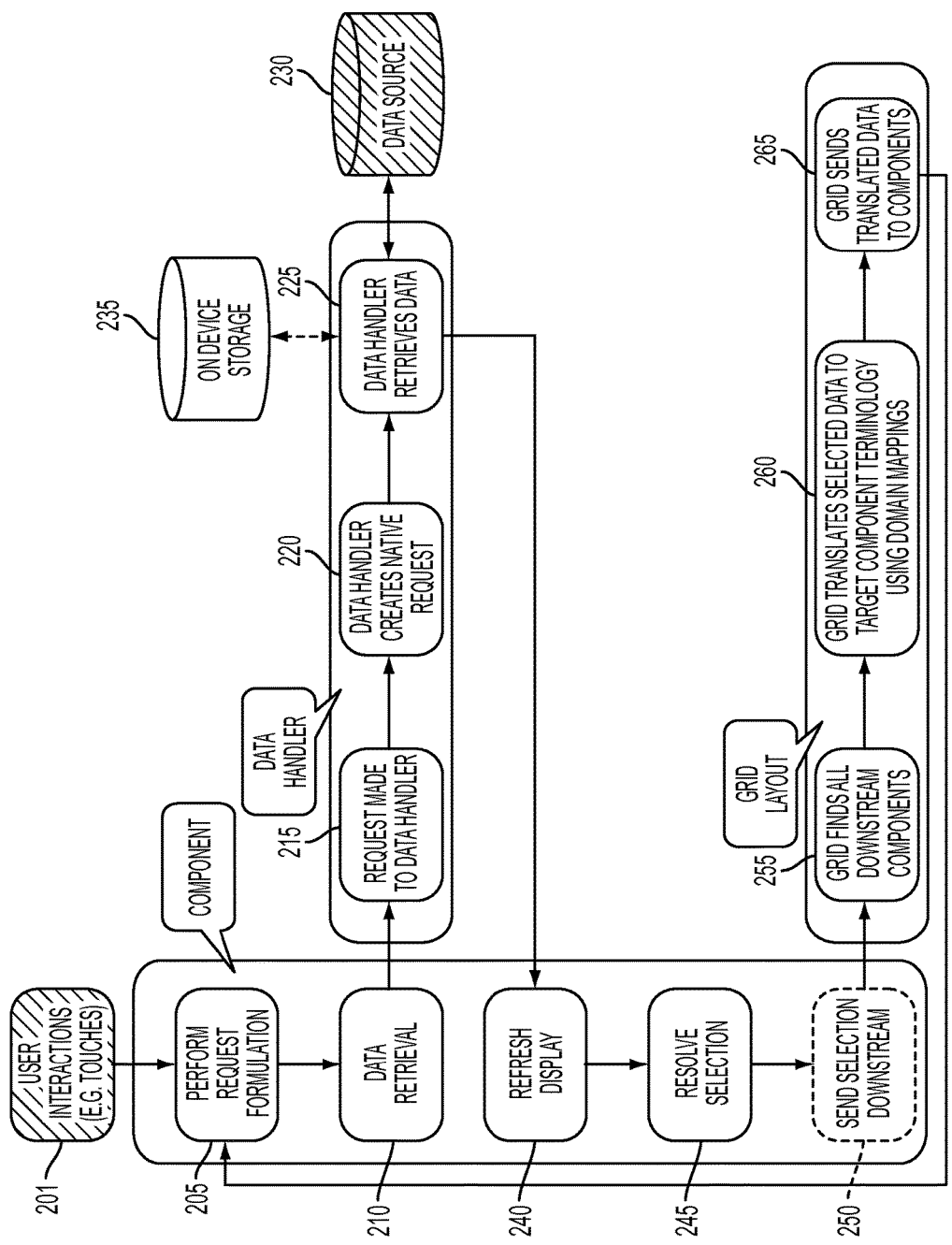
FIG. 2 is a flowchart showing a method according to the invention.
Figure 3:
Figure 4:
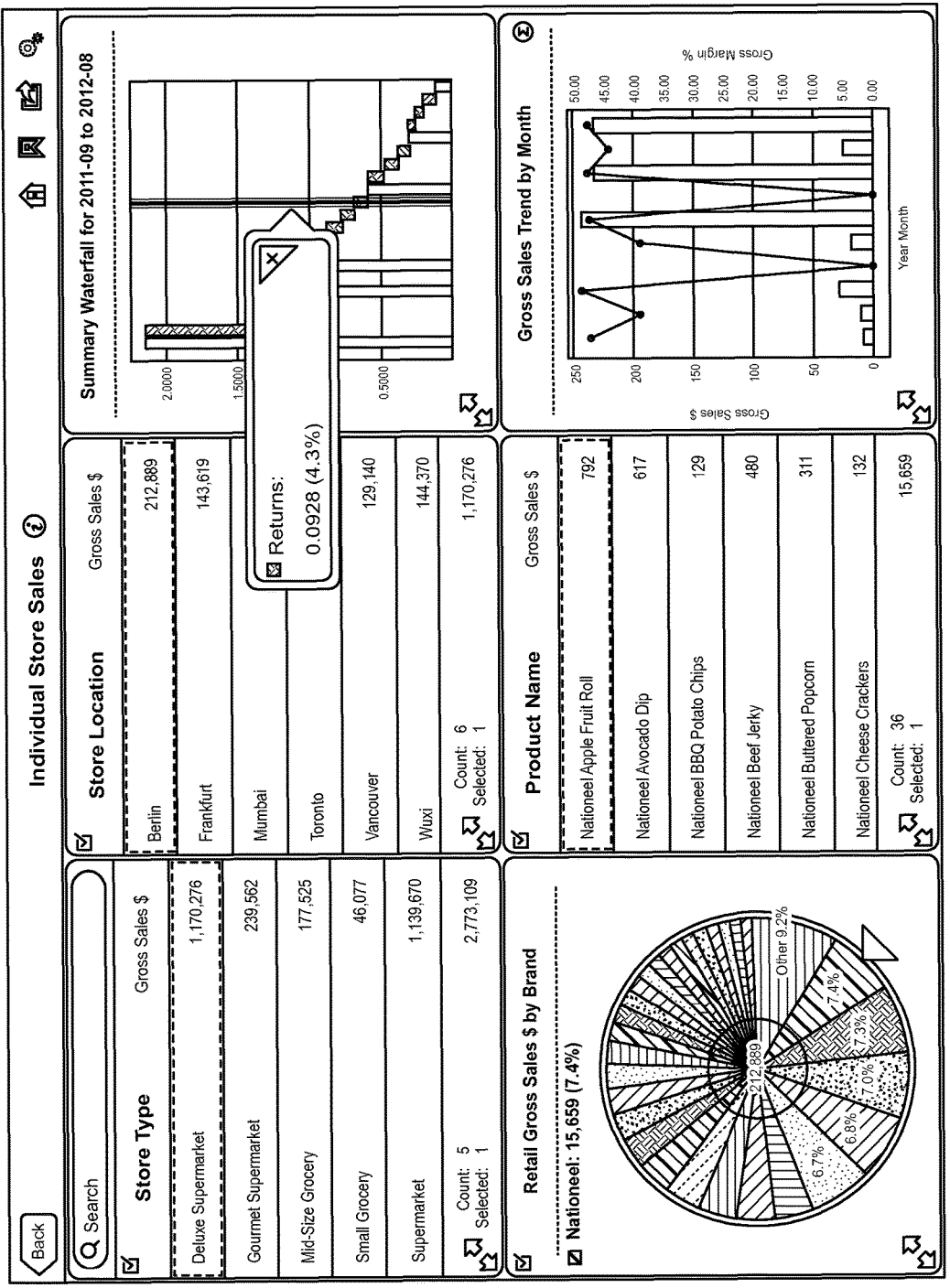
Figure 5:
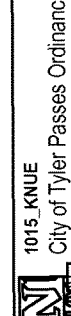
Figure 6:
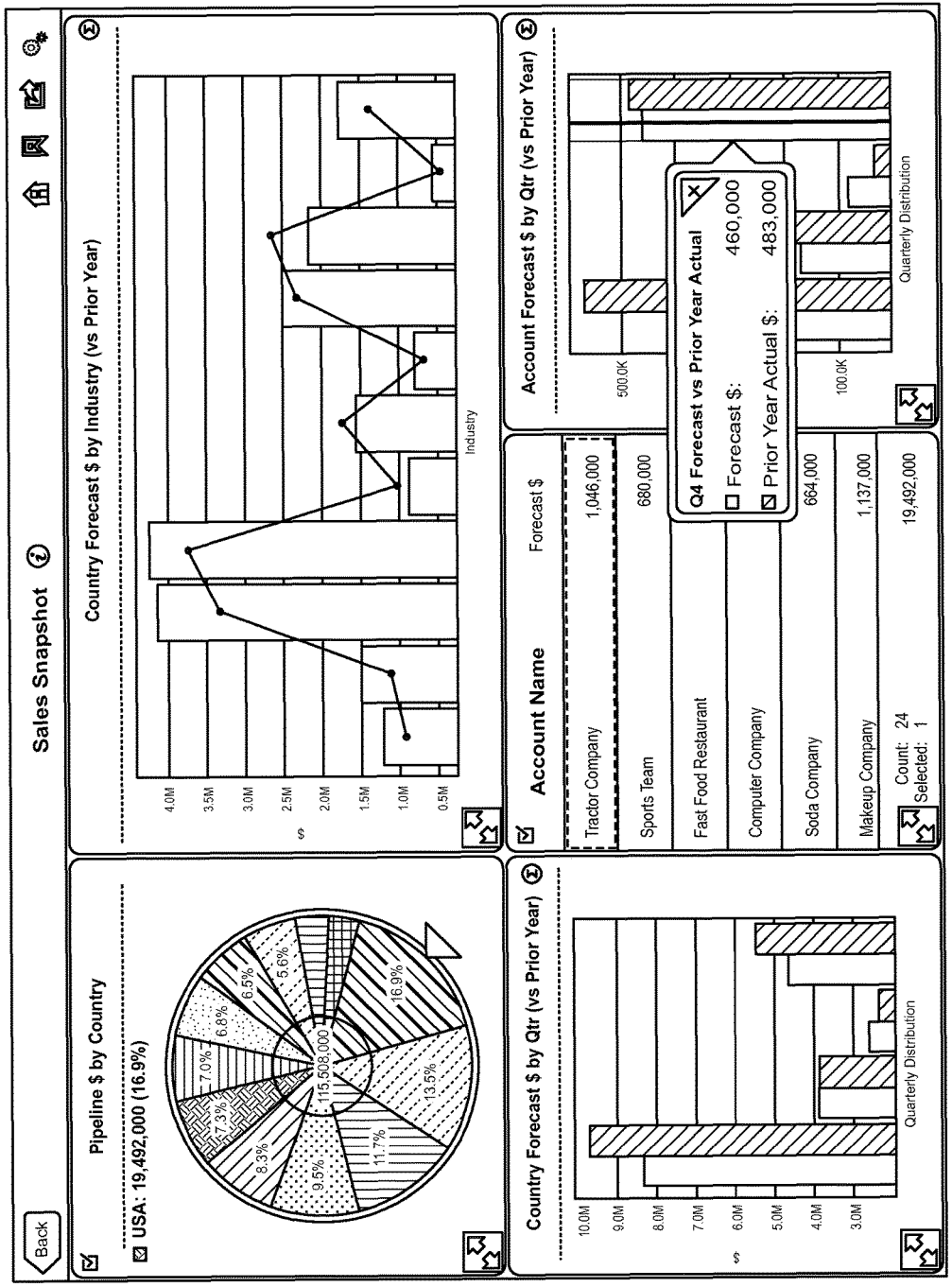

Referring now to FIG. 2, there is shown another embodiment of the invention which includes a method for collating and displaying information, which preferably uses the system as defined above. At step 201 a user identifies a domain and initiates an information request at step 205. Identifying a domain may, in its simplest form, be a selection by the user of a type of data or information desired. For example, the domain may be defined as all information related to a particular business, product, business segment, etc. The information request may be user generated, but is preferably triggered by either the analytical server or by a computing device automatically in response to the domain selection of the user. Data retrieval is then initiated at step 210 by a request made to each data handler associated with various sources at step 215. The data handler then creates a native request at step 220, retrieves the data at step 225 from a data source 230, and stores the retrieved data in an on-device storage 235. This step occurs for each data handler being used.

In embodiments where the analytical engine is employed, the analytical engine converts data from structured data sources and from unstructured data sources into a common structured data source, and stores this data on a computer readable medium itself. From this stage, the engine data handler functions as any other data handler as herein described.

The data handler then arranges for a visual element to be updated with the retrieved information at step 240, and a user selection of desired information is resolved at step 245. This data is then sent downstream as a series of visual components at step 250, such that it can be displayed according to relevant schema on the grid. A grid module discovers all downstream visual components at step 255 and arranges translation of selected data to use domain mappings at step 260. The grid module then sends translated data to the visual elements at step 265 and the process is repeated.

In particular, the method provides for identifying a plurality of information sources. These may include information sources internal to a business organization, such as a bill of material system, a human resources system, etc. External information sources are also contemplated and may included, by way of non-limiting example, news sources, public financial information sources and social media sources. For example, in the situation where the information subject is a particular company, the plurality of information sources may include one which provides a summary of annual sales data for the company, news feed information regarding the company, a snapshot of the company's Twitter™ feed, and an online profile of the company. It is also contemplated that in some embodiments, a subset of the information sources available are selected either automatically, or by a user.

Once these sources of information have been identified, and the appropriate subset selected (if applicable), a predetermined format to display information from each of these sources is automatically generated such that the extracted information can all be displayed in an organized and cohesive manner on a single computer screen, or in alternate embodiments, on a single mobile device or tablet screen. Some examples of such predetermined formats are shown in FIGS. 3-7.

In the example regarding the particular company described above, suppose a subset of information sources is identified that includes an online company profile, the company's Twitter™ stream, and public news regarding the company, this data is collated by the analytical engine and arranged to be presented on a single tablet device screen. According to the invention, the screen presentation and layout are handled automatically by the analytical engine, or software implementation of the equivalent. Examples of these layouts are shown in FIGS. 3-7. Accordingly, a user is not required to reposition, re-size, or allocate screen space to individual windows that may make it difficult to view information in each window.

In the prior art, a user would, for example, be required to open separate Internet browser windows, navigate to websites that display this type of information if any are available and then orient these websites on the screen. Applicant's invention on the other hand, permits the automated retrieval of information from various possible sources, including websites, arranges for these to be displayed in a manner efficient for viewing or retrieving information on the screen. In addition, the invention permits for the retrieval of information that is not located on websites, such as data stored in a data storage internal to a company. In this manner, the invention is not to be considered limited to particular sources of data, however, specially preferred embodiments include data sources from a combination of categories of data types. These categories may include data or information from social networking sites, public news sources, public financial data, internal company data and forecast information. When the invention is used internally at a company, for example, a snapshot of information including public and private information can be readily collated, and displayed on a tablet screen for presenting snapshot data of the company, for example. The information can also be used for analysis, marketing and other purposes.

The analytical engine may provide a central communication point by which each of the computer systems in contact therewith can access lists of possible information sources. In operation, this could be embodiment by software installed on the computer device, such as the tablet, that is in communication with the analytical engine. When a user is desirous of using the invention, the software on the table communicates with the analytical engine to present a list of information sources to the user. Once the user has selected a subset of these information sources, the analytical engine determines an optimal formatting to display each of the information sources and communicates this to the tablet device, which then displays the information according to these instructions. Alternatively, the software on the tablet device can arrange for these functions.

Once the information is displayed on the screen, various user options may be available. For example, a user may choose to add additional source information, replace one source for another source, select options to optimize the layout of the screen for the particular user.

The invention claimed is:

1. A system for collating and presenting information comprising:
   at least one structured data source on a non-transitory computer readable medium;
   at least one unstructured data source on a non-transitory computer readable medium;
   an analytical engine in data communication with said at least one structured data source and said at least one unstructured data source, said analytical engine, in response to a domain selection by a user, retrieves, combines and transforms data from said at least one structured data source and from said at least one unstructured data source into newly structured data, said newly structured data being stored on a computer readable medium;
   an engine data handler adapted to: correspond with said analytical engine, access said newly structured data, create a secure session to perform queries on said at least one structured data source and on said at least one unstructured data source, and create a native request to retrieve the data from said at least one structured data source and from said at least one unstructured data source;
   a schema definition stored on a computer readable medium accessible by said analytical engine and executed by a computer processor to reflect groupings of data retrieved from the engine data handler in response to a user query;

a processor for configuring at least one or more state views into a plurality of visual elements representing the newly structured data, each of said plurality of visual elements divided into a plurality of components, the visual elements capable of being displayed on a screen;

grid layout definitions, defining relational interactions between the plurality of visual elements: and a grid module executed by said processor and adapted to translate data based on domain mappings and to display the plurality of visual elements on the screen;

wherein each of said plurality of components is adapted to send selected information to other components of the plurality of components on the same grid.

2. The system according to claim 1, further comprising at least one secondary structured data source; at least one secondary unstructured data source; a first data handler in communication with said secondary structured data source; a second data handler in communication with said secondary unstructured data source.

3. The system according to claim 2, further comprising at least one client computing devices in data communication with said analytical engine.

4. The system according to claim 3, wherein said at least one client computing devices are in data communication with one or both of said first and second data handlers, independently of said engine data handler.

5. The system according to claim 4, wherein said at least one secondary structured data source includes an SQL data source.

6. The system according to claim 4, wherein said at least one secondary unstructured data source includes a social media feed.

7. The system according to claim 1, further comprising additional schema definitions accessible by said at least one client computing device to define at least one additional set of domain rules based on one or both of said secondary structured data and said secondary unstructured data.

8. The system according to claim 1, wherein said plurality of visual elements are displayed in their entirety on said screen in a single display view.

9. A method for collating and presenting information comprising:

providing at least one structured data source on a non-transitory computer readable medium;

providing at least one unstructured data source on a non-transitory computer readable medium;

in response to a domain selection by a user, retrieving, combining and transforming said at least one structured data source and said at least one unstructured data source into newly structured data using an analytical engine in data communication with said at least one structured data source and said at least one unstructured data source;

storing said newly structured data on a computer readable medium;

accessing said newly structured data by an engine data handler;

creating a secure session to said at least one structured data source and said last least one unstructured data source;

creating a native request to retrieve the data from said at least one structured data source and said last least one unstructured data source;

providing a schema definition stored on a computer readable medium accessible by said analytical engine and executing said schema definition by a computer processor for reflecting groupings of data retrieved from the engine data handler in response to a user query;

configuring at least one or more state views into a plurality of visual elements representing the newly structured data, each of said plurality of visual elements divided into a plurality of components, the visual elements capable of being displayed on a screen; and defining relational interactions between the plurality of visual elements;

translating the newly structured data based on domain mappings; and displaying, by a grid layout module, the plurality of visual elements on said screen;

wherein each of the plurality of components is adapted to send selected information to other components of the plurality of components on the same grid.

10. The method according to claim 9, further comprising providing at least one secondary structured data source; providing at least one secondary unstructured data source; accessing said at least one secondary structured data source by a first data handler; and, accessing said at least one secondary unstructured data source by a second data handler.

11. The method according to claim 10, further comprising providing at least one client computing devices in data communication with said analytical engine.

12. The method according to claim 11, wherein said at least one client computing devices are in data communication with one or both of said first and second data handlers, independently of said engine data handler.

13. The method according to claim 12, wherein said at least one secondary structured data source includes an SQL data source.

14. The method according to claim 12, wherein said at least one secondary unstructured data source includes a social media feed.

15. The method according to claim 9, further comprising providing additional schema definitions accessible by said at least one client computing device to define at least one additional set of domain rules based on one or both of said secondary structured data and said secondary unstructured data.

16. The method according to claim 9, wherein said plurality of visual elements are displayed in their entirety on said screen in a single display view.

* * * * *